March 12, 1968   C. A. BARNARD   3,372,807
FILTER
Filed Dec. 19, 1966   3 Sheets-Sheet 1
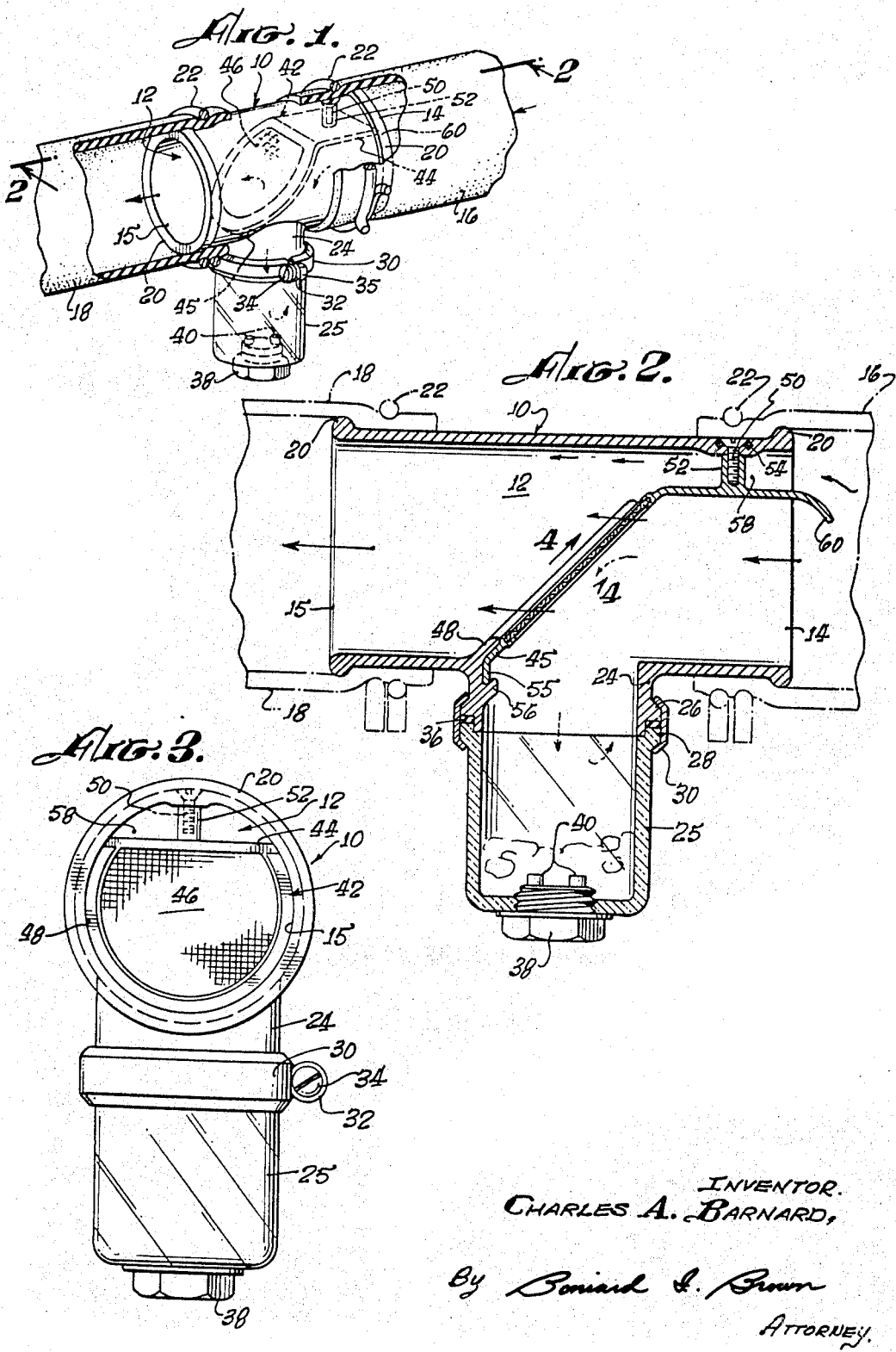
INVENTOR.
CHARLES A. BARNARD,
By Bernard J. Brown
ATTORNEY.

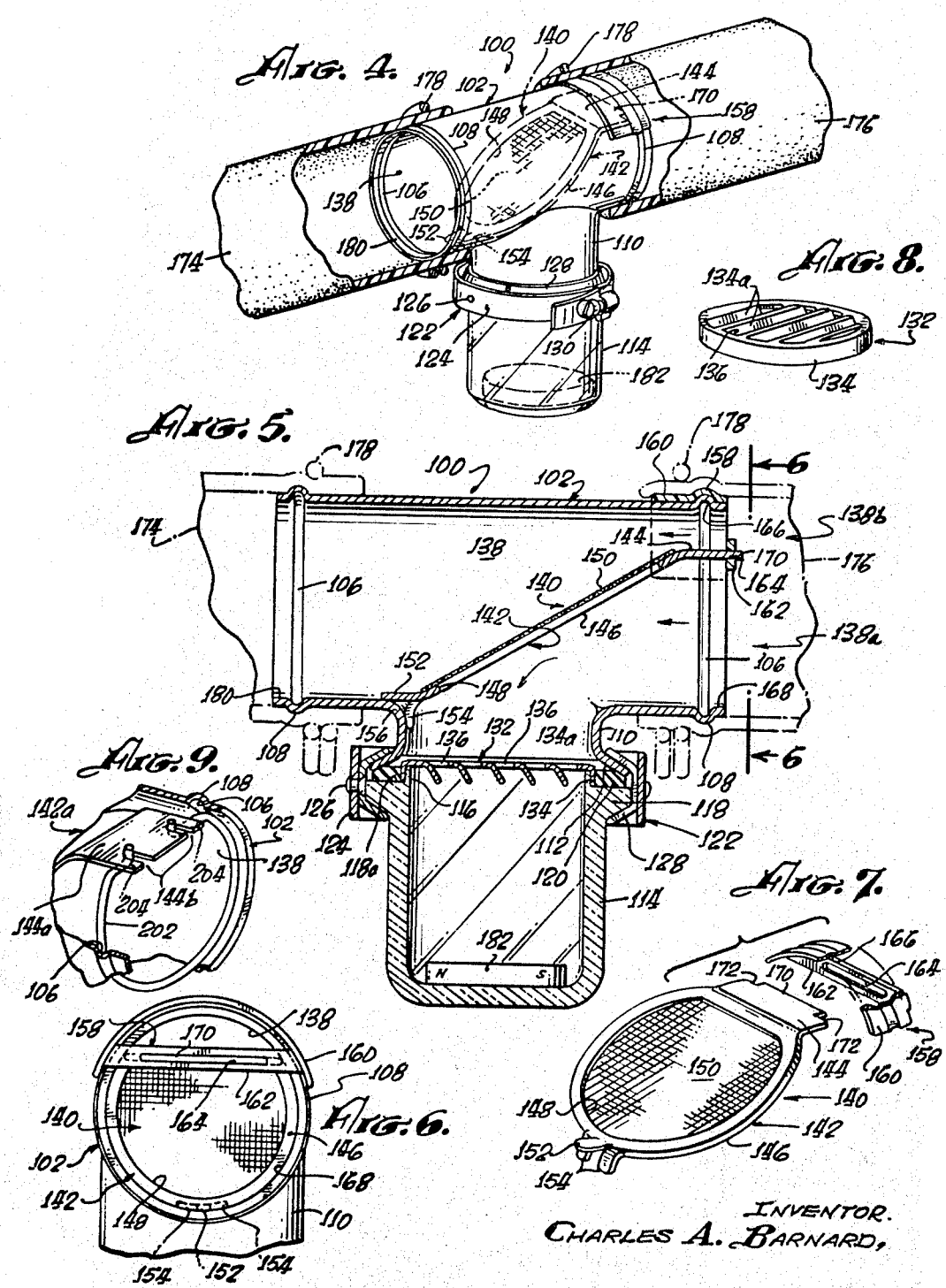

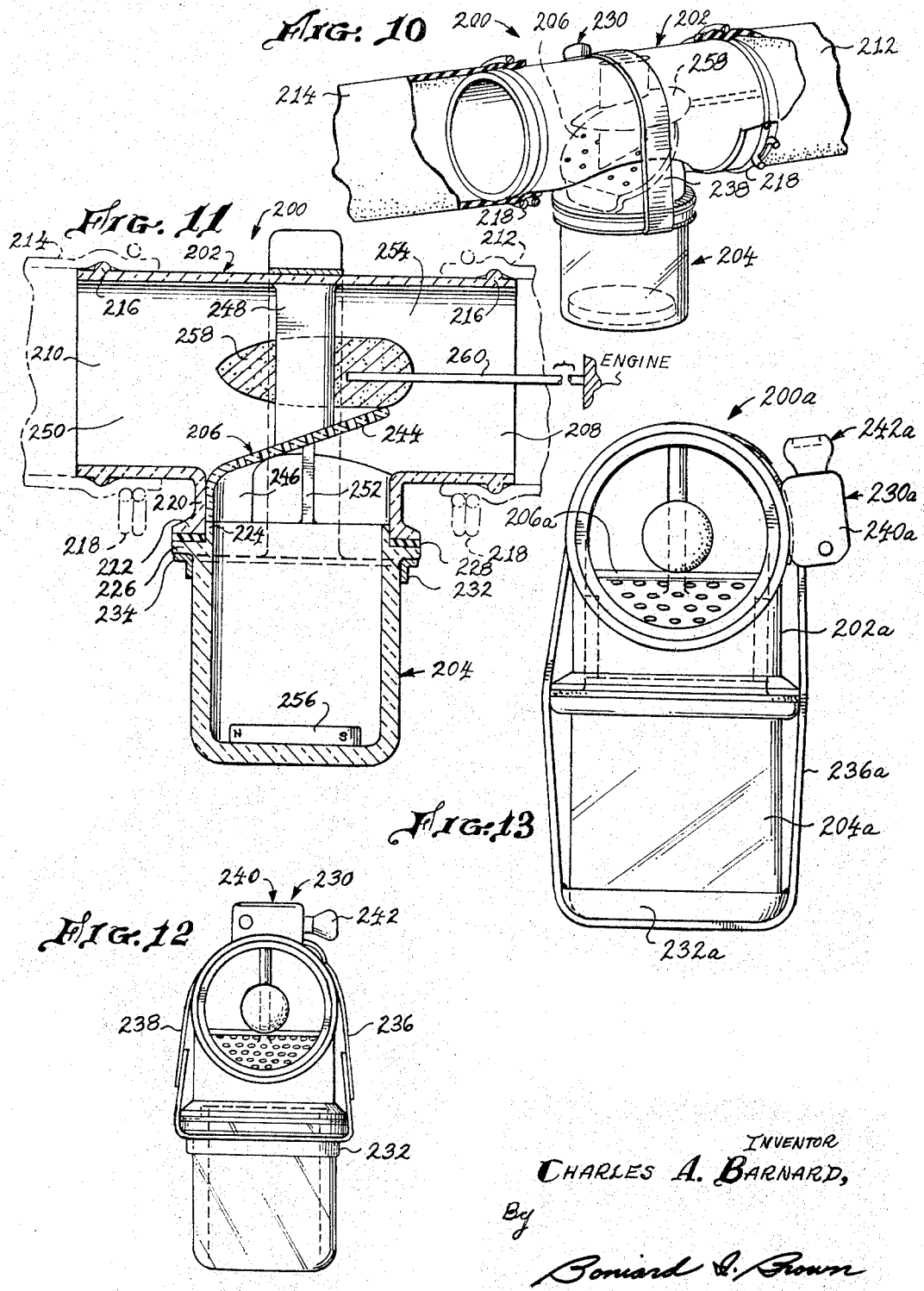

United States Patent Office 3,372,807
Patented Mar. 12, 1968

3,372,807
FILTER
Charles A. Barnard, 813 W. J St.,
Ontario, Calif. 91762
Continuation-in-part of application Ser. No. 409,776,
Nov. 9, 1964. This application Dec. 19, 1966, Ser.
No. 602,779
7 Claims. (Cl. 210—94)

ABSTRACT OF THE DISCLOSURE

An accessory for installation in the engine cooling system of an automotive vehicle to trap foreign material entrained in the engine coolant, the accessory having a main coolant conduit removably mounting a filter bowl, and an inclined filter within the conduit for separating out foreign material from the coolant and diverting the foreign material into the filter bowl, the filter being removable for cleaning and spanning a portion only of the coolant passage in the conduit, whereby sufficient coolant is permitted to flow through the engine to prevent overheating even though the filter is clogged.

---

This application is a continuation-in-part of my earlier application Ser. No. 409,776, filed Nov. 9, 1964, and my co-pending application Ser. No. 503,895 filed Oct. 23, 1965, and entitled, "Filter," both now abandoned.

This invention relates to an accessory for use in the cooling system of an internal combustion engine and, more particularly, relates to a combined filter and trap for installation in the hose conduit between the engine and the associated radiator.

It is well known that the circulating liquid in the cooling system of the engine of an automobile vehicle entrains particles of scale, rust, rubber, grease and other foreign materials which with the passage of time accumulate in various parts of the cooling system and progressively clog the fluid passages to reduce the cooling action. It is also well known that as an automobile vehicle ages the rate of deposit of such materials in the coolant accelerates to aggravate the situation.

As a result cooling systems fail and too often cause damaging heating of engines. The owner of an automotive vehicle may take the precaution of having the cooling system serviced frequently but even such a precaution may fail to prevent serious trouble.

Various types of filters have been suggested for use in the cooling system of an internal combustion engine to remove the foreign materials from the circulating liquid. A certain problem arises, however, because such a filter may be neglected and consequently become clogged to such extent as to destroy the efficiency of the cooling system. Thus a filter may quickly create the very difficulty it is intended to eliminate.

The present invention meets this situation by a filter unit of relatively simple and inexpensive construction which has an inherent bypass action to keep the cooling system effective even when the filter is clogged to the maximum. To this end, the filter unit includes a filter element or insert which spans a portion only of the coolant passage through the unit. The remaining unspanned portion of the passage defines a coolant bypass around the filter insert. This bypass has a flow capacity adequate for effective functioning of the cooling system even though the filter insert becomes completely clogged. The filter insert diverts foreign matter into a trap in the form of a receptacle or bowl which, and the filter insert, are removable for cleaning. The filter bowl is preferably equipped with a magnet for attracting and retaining ferromagnetic particles entrained in the engine coolant and constructed of a transparent material to permit visual observation of the level of accumulated foreign matter in the bowl. According to a further preferred practice of the invention, the main body of the filter unit is constructed of a transparent material to render visible the level and condition of the engine coolant and the condition of the filter insert.

In the event that the filter element and the bowl become clogged to maximum capacity there is the possibility that additional foreign material may accumulate in the bypass. In this regard a feature of one embodiment of the invention is the provision of a baffle which defines one wall of the bypass portion of the coolant passage and which is of bent configuration to form a divergent or tapering entrance to the bypass. The circulating fluid sweeps along the baffle with increasing velocity to accelerate foreign particles through the bypass thereby to minimize the tendency for foreign matter to clog the bypass.

A further feature of the invention resides in an inexpensive and efficient arrangement for mounting the filter insert in the unit. According to this feature, simplified mounting means are provided for securely but releasably positioning the filter insert in the coolant passage of the unit in such a way that the insert may be removed for cleaning or replacement when necessary. In the preferred embodiment of the invention, for example, the insert is quickly and easily removable through the wall opening in the filter unit which opens to the filter bowl by first removing the bowl.

A further feature of the invention is that a major portion of the filter insert overlies the filter bowl wall opening in the filter unit and the insert inclines toward this opening in the direction of coolant flow through the unit, whereby the coolant acts to continuously sweep foreign matter from the insert into the filter bowl. An additional advantage of this arrangement is that when the bowl is removed, the working area of the filter insert is exposed in a conveniently accessible manner for easy cleaning without removal of the insert and any material dislodged from the filter member by the cleaning operation is free to gravitate through the opening that is created by the temporary removal of the bowl.

The features and advantages of the invention may be understood from the following detailed description and the accompanying drawings.

In the drawings, which are to be regarded as merely illustrative:

FIGURE 1 is a perspective view of a filter unit according to the invention illustrating the unit installed between two sections of radiator hose, portions of the hose being broken away for the sake of clarity;

FIGURE 2 is an enlarged longitudinal section through the filter unit;

FIGURE 3 is an elevation of the downstream end of the filter unit;

FIGURE 4 is a perspective view of a modified filter unit according to the invention, illustrating the unit installed between two sections of a radiator hose, portions of the hose being broken away for the sake of clarity;

FIGURE 5 is an enlarged longitudinal section through the filter unit in FIGURE 4;

FIGURE 6 is a view looking in the direction of arrows on line 6—6 of FIGURE 5;

FIGURE 7 is an exploded perspective view of the filter element or insert and its support embodied in the filter unit of FIGURES 4 and 5;

FIGURE 8 is a perspective view of a louvered barrier member or baffle embodied in the filter unit of FIGURES 4 and 5;

FIGURE 9 is a fragmentary perspective view illustrating an alternative mounting for the filter insert in the filter unit of FIGURES 4 and 5;

FIGURE 10 is a perspective view of a further modified and presently preferred filter unit according to the invention, illustrating the unit installed between two sections of a radiator hose;

FIGURE 11 is an enlarged vertical section through the filter unit of FIGURE 10;

FIGURE 12 is a right hand end view, on slightly reduced scale, of the preferred filter unit; and FIGURE 13 is an enlarged view similar to FIGURE 12 illustrating the filter unit equipped with a modified filter bowl clamp.

The embodiment of the invention shown in FIGURES 1 through 3 of the drawings has a hollow body, generally designated 10, forming a fluid passage 12 with an inlet port 14 at one end of the body and an outlet port 15 at the other end. For use in an automotive vehicle, the device is intended to be mounted between two sections of hose 16 and 18 that connect the outlet of the water jacket of an internal combustion engine (not shown) with the inlet of the radiator (not shown) of the cooling system for the engine. To facilitate connection to the two hose sections 16 and 18 the opposite ends of the hollow body 10 are formed with outer circumferential beads 20 which telescope into the hose sections as shown, the joints being secured by coil spring wire clamps 22 in a well-known manner.

The hollow body 10 is formed with a downward cylindrical extension 24 that is adapted to support a suitable trap such as a cup-shaped bowl 25 of transparent glass or plastic. In the construction shown, the confronting ends of the cylindrical extension 24, and the filter bowl 25 are enlarged to form corresponding outer circumferential shoulders 26 and 28 respectively for engagement by a split clamp ring 30. In a well-known manner the two ends of the clamp ring 30 are formed with radial ears 32, shown in FIGURES 1 and 3, which are interconnected by a suitable screw 34 and nut 35. As may be seen in FIGURE 2, the joint between the cylindrical extension 24 of the body 10 and the filter bowl 25 is of stepped configuration with an interposed sealing ring 36 which is suitably compressed by tightening of the clamp ring.

Preferably the filter bowl 25 is provided with means for magnetically attracting ferromagnetic particles. For this purpose the bottom end of the bowl is provided with a screw-threaded plug 38 which incorporates a U-shaped permanent magnet having a pair of poles 40.

The interior of the hollow body 10 is suitably adapted to support an inclined filter element or insert 42 in a position over the filter bowl 25. In this particular embodiment of the invention, the filter insert combines the functions of a baffle and a filter. Thus the filter insert 42 has an upstream baffle portion 44 and a downwardly inclined portion 45 which has a relatively large opening spanned by a filter body 46. The filter body 46, or filter as it is hereinafter referred to, may be made of any suitable perforate material and may comprise simply a perforated disk but in this instance the filter is of woven metal cloth.

Preferably the filter insert 42 is mounted in the coolant flow passage 12 in a removable manner and any suitable construction may be used for this purpose. In the construction shown, the upstream side of the inclined portion 45 of the filter insert 42 abuts an inner flange 48 of the hollow body 10, the flange being U-shaped as shown in FIGURE 3. The upstream baffle portion 44 of the filter insert 42 is removably connected to the upper wall of the hollow body 10 by a suitable screw 50. In the construction shown, the screw 50 threads into an upright sleeve 52 that is integral with the baffle portion 44 and the head of the screw seats against a suitable sealing ring 54. Obviously the sleeve 52 may be a separate member without threads to serve as a spacer sleeve with the screw extending through the baffle portion 44 and equipped with a suitable nut.

It is contemplated that the angular filter insert 42 will be somewhat resilient and will be shaped to yieldingly press against the inner flange 48 when the screw 50 is tightened. In the construction shown, however, the lower end of the inclined portion 45 of the angular filter insert is bent to form a downwardly extending lip 55 and the interior of the hollow body 10 in the region of the cylindrical extension 24 is formed with an undercut shoulder 56 which seats the lip and cooperates with the flange 48 to confine the lip. Thus with the upstream end of the angular filter insert 42 secured by the screw 50 and with the lip 55 at the downstream end effectively confined, the insert is securely and rigidly anchored in place.

It is apparent that the upstream baffle portion 44 of the angular filter insert 42 divides the flow passage 12 at the inlet port 14 into a lower portion which is spanned by the filter insert 42 and an upper portion or bypass 58 around the insert. In this regard a feature of the invention is that the leading end of the baffle portion 44 is curved downward to form a leading lip 60 which overhangs the lower portion of the fluid passage and which serves as baffle means to divert or deflect a portion of the lower fluid stream into the bypass 58.

Since the purpose of the bypass 58 is to keep the cooling system operative in the event that the filter 46 becomes completely clogged, the flow capacity of the bypass must be adequate to keep the engine from overheating when the total flow of the cooling liquid is confined to the bypass. On the other hand it is desirable for as large a portion as possible of the fluid stream to be directed through the filter 46.

It has been found that if the baffle portion 44 of the filter insert 42 is spaced downward from the upper side of the flow passage 12 by a distance that is equal to approximately 15 percent of the inside diameter of the flow passage, the flow capacity of the bypass 58 will be adequate and at the same time a sufficiently large proportion of the fluid stream will be directed through the filter 46 to serve the purpose of the invention. It is to be noted that the diverting action of the upstream baffle lip 60 increases the flow capacity of the bypass 58 and at the same time accelerates flow through the bypass to greatly reduce any tendency for entrained foreign material to clog up the bypass.

If desired the distance of the baffle portion 44 from the upper wall of the passage 12 may be increased to approximately 25 percent of the inside diameter of the flow passage. If the distance is increased in this manner to give the bypass 58 greater flow capacity, a lesser portion of the stream is directed through the filter 46 but since the cooling liquid is continually recycled, a sufficient amount of the foreign material is diverted into the filter bowl 25 to serve the purpose of the invention.

It is to be noted that substantially the whole area of the inclined filter 46 lies directly above the filter bowl 25. Thus the filter is in an optimum position for diverting foreign material into the bowl 25 and any foreign particles which drop away from the filter drop directly into the bowl.

When visual inspection of the bowl 25 reveals the accumulation of a substantial amount of foreign material, it is a simple matter to loosen the clamp ring 30 and remove the bowl for cleaning. An important feature of the invention is that when the filter bowl is removed the whole area of the filter 46 is readily and conveniently accessible for a cleaning operation and any foreign material that is dislodged from the filter in the cleaning operation simply gravitates through the opening that is created by removal of the bowl. If a more thorough cleaning operation is required it is a simple matter to disengage the inlet end of the hollow body 10 from the hose 16 so that the whole filter insert 42 may be removed by loosening the screw 50.

The filter unit just described is completely satisfactory from the functional standpoint and has been found to be highly effective in removing foreign matter from the cooling systems of automotive vehicles. FIGURES 4 through 8 illustrate a modified, filter unit 100 according to the invention which is just as effective, from the functional standpoint, as a filter unit of FIGURES 1 through 3 and is superior to the latter filter from the standpoint of simplicity of construction, economy of manufacture, and ease of installation.

Filter unit 100 has a hollow body 102 similar in shape to the body of the earlier filter unit. In contrast to the relatively thick walled, cast construction of the latter filter body, however, the body 102 of the filter unit 100 has a relatively thin-wall of generally uniform thickness and may be fabricated by a simple, low cost cold metal forming operation. The inlet and outlet ends of the body are internally embossed with circumferential grooves 106 which define external, circumferential beads 108 about the body. The lower extremity of the body extension 110 is flared to define an external flange 112 about the extension.

The transparent filter bowl 114 is coaxially disposed below the body extension 110, as before. This bowl has an upper, coaxial cylindrical rim 116 surrounded by an external flange 118 having an annular, upwardly presented shoulder face 118a. Shoulder face 118a is axially spaced from the annular end face of the bowl rim 116 and seats a seal ring 120. Seal ring 120 bears against the inner, axially presented face of the extension flange 112 on the filter body 102. Filter bowl 114 is secured to the housing extension 110 by a hose clamp 122 including a flexible band 124 which encircles the extension flange 112 and the bowl flange 118. Secured, by rivets 126, to the inner surface of the band 124 is a split flexible, internally grooved clamp ring 128. The groove in this ring receives the flange 112 in the filter body 102 and the flange 118 on the filter bowl 114. The upper and lower walls of the clamping ring groove are conically tapered and bear against the conically tapered upper and lower surfaces of the extension flange 112 and bowl flange 118, respectively. Accordingly, when the hose clamp 122 is tightened by rotating the clamp screw 130, the clamp ring 128 is constricted about the extension flange 112 and the bowl flange 118 in such a way as to urge these flanges toward one another and into sealing relation with the intervening seal ring 120.

According to the preferred practice of the invention, a louvered barrier member or baffle 132 is disposed across the mouth of the filter bowl 114 for reasons to be explained presently. This baffle is circular in shape and comprises a downturned, perimetrical flange 134 which is dimensioned to fit over the bowl rim 116, in the manner illustrated in FIGURE 5. Extending across the baffle 132 are a number of downturned louvers 134 which are disposed in spaced, generally parallel relation and define therebetween a series of openings 136 through the baffle. The baffle is retained in position on the bowl 114 by frictional engagement of the baffle rim flange 134 with the bowl rim 116 and the axially compressed seal ring 120.

Disposed within the fluid passage 138 through the filter body 102 is a filter element or insert 140. As in the previous form of the invention, filter insert 140 combines the functions of a baffle and a filter. Thus, the filter insert comprises a sheet metal frame 142 having an upstream baffle portion 144 and a downwardly inclined portion 146. Extending through the downwardly inclined portion 146 of the baffle frame is a relatively large opening 148 spanned by a perforate filter 150. As in the previous form of the invention, the filter may be made of any suitable perforate material and may comprise, simply, a perforated disk. The illustrated filter, however, is constructed of woven metal cloth.

Integrally formed on the lower end of the baffle frame 142 are three tabs 152 and 154. Tab 152 is located between the tabs 154 and is bent upwardly at a slight angle relative to the filter frame portion 146. The tabs 154 are bent downwardly relative to the filter frame portion 146 to positions such that the included angle between the plane of the tab 152 and the plane of the tabs 154 is approximately a right angle. When the filter insert 140 is installed in the filter passage 138, the tabs 152 and 154 on the member straddle the downstream side of the annular edge defined by the juncture of the cylindrical wall of the filter body 102 and a cylindrical wall of the filter body extension 110. Straddling engagement of the tabs with the annular edge 156 retains the lower end of the filter insert in fixed position within the filter body 102. The upper end of the filter insert 140 is supported on a bracket member 158 mounted on the filter body 102. Bracket member 158 comprises a cylindrically curved flange 160 and a cross member 162 which is secured to and extends across one end of the flange. This cross member has a longitudinal slot 164. The cylindrical flange 160 of the bracket is embossed with an internal, circumferentially extending groove 166. When the bracket 158 is installed on the filter body 102, the bracket flange 160 is located externally of the body and seats against the upper surface of the body adjacent the inlet end thereof. The internal flange groove 166 receives the adjacent bead 108 on the body. The connecting member 162 of the bracket extends across the inlet port 168 on the body. Extending from the edge of the upper baffle portion 144 on the filter insert 140 is a tongue 170. This tongue is somewhat narrower than the baffle portion 144, whereby the juncture of the tongue and the baffle portion define shoulder edges 172 at opposite ends of the tongue. When the filter insert is installed in the filter passage 138, the tongue 170 on the insert engages in the slot 164 in the bracket 158, whereby this bracket supports the upper end of the insert. The shoulders 172 on the filter insert engage the cross member 162 of the bracket at opposite ends of the bracket slot 164, thereby to limit inward movement of the tongue 170 into the slot.

As shown in FIGURES 4 and 5, the filter unit 100 is installed by inserting the inlet and outlet ends of the filter body 102 into spaced sections 174 and 176 of the vehicle radiator hose. The hose section 176 which receives the inlet end of the body fits over the cylindrical flange 160 of the filter insert supporting bracket 158, thereby to secure this bracket in position on the body. As in the previous form of the invention, the hose sections 174, 176 are secured to the filter body 102 by hose clamps 178 which encircle the hose sections inwardly of the beads 108 on the body.

Bracket 158 supports the upstream baffle portion 144 of the filter insert 140 in spaced relation to the upper wall of the filter body 102. Accordingly, the upstream baffle portion 144 divides the upstream or inlet end of the filter passage 138 into a lower portion 138a which is spanned by the filter insert and an upper portion or bypass 138b. As in the previous form of the invention, the purpose of the bypass 138b is to assure adequate coolant flow through the engine to prevent overheating even though the filter 150 becomes completely clogged. To this end, the passage portion 138a and the bypass 138b are proportioned, as in the earlier form of the invention, so that a portion of the coolant, sufficient for effective filtering thereof, will flow through the passage portion 138a under normal operating conditions, and adequate coolant flow will occur through the bypass 138b to prevent overheating of the engine in the event of complete blockage of the filter 150.

The modified filter unit 100, just described, operates in much the same way as the filter unit described earlier. Thus, under normal operating conditions, the coolant entering the unit through its inlet port 168 divides between the lower portion 138a and the upper bypass 138b of the filter passage 138. The portion of the coolant entering the lower passage portion 138a flows through the filter 150 to the outlet port 180 of the unit. The filter removes from the coolant any foreign matter entrained therein, which foreign matter is swept into the filter bowl 114. Preferably, this bowl contains a permanent magnet 182 for attracting and holding any ferromagnetic particles entering the bowl. The louvered baffle 132 provides a barrier between the filter bowl and the main coolant stream flowing through the filter passage 138 which aids in preventing the re-entrance into the main coolant stream of the foreign matter within the bowl. As in the earlier form of the invention, the filter bowl 114, being transparent, permits visual observation of the level of accumulated foreign matter in the bowl. Periodically, the filter bowl is removed for cleaning by releasing the clamp 122. It is significant to note that the louvered baffle 132 is removed with the bowl, thereby exposing the upstream side of the filter 150 for cleaning. If necessary, the entire filter insert 140 may be removed by disconnecting the radiator hose section 176 from the filter unit.

FIGURE 9 illustrates an alternative mounting arrangement for the upper end of the filter insert. In this case, the filter insert 142a is provided with an upper baffle portion 144a having slots 144b for receiving the upwardly extending ends of a snap ring 202 which is fitted in the groove 106 within the inlet end of the filter body 102. The portions of the snap ring 202 immediately adjacent the ends 200 thereof extend transversely of these ends to define shoulders 204 for vertically supporting the filter baffle portion 144a. The friction between the ring ends 200 and the walls of the slots 144b in the filter insert retains the upper baffle portion 144a of the member in supporting engagement with the snap ring 202. If desired, however, the ring ends 200 may be bent over the top of the baffle portion to positively retain the latter in supporting engagement with the snap ring.

Reference is now made to FIGURES 10 through 13 which illustrate further modified and presently preferred embodiments of the invention. The modified filter 200 shown in FIGURES 10 through 12 is generally similar to the earlier forms of the invention and comprises a filter body 202 mounting a removable filter bowl 204 and containing a removable filter element or insert 206. In contrast to the earlier forms of the invention, the filter body, filter bowl, and filter insert are all preferably constructed of a transparent material, such as a high strength, heat resistant, transparent plastic. This permits visual observation of the level of accumulated foreign matter in the filter bowl, as before, and, in addition, visual observation of the condition and level of the engine coolant without removal of the engine radiator cap as well as the condition of the filter insert. Visual observation of the coolant level without removal of the radiator cap, of course, is desirable since it eliminates the safety hazard attendant to removal of the cap to check the coolant level when the engine is hot.

Proceeding now with a more detailed description of the filter unit 200, the filter body 202 has the same general T-shape as the filter bodies of the earlier filter units of the invention and may be conveniently fabricated by a plastic molding process. The body has an inlet end 208 and an outlet end 210 which are adapted to receive the engine radiator hose sections 212, 214. These ends of the body are formed with external circumferential beads 216. The filter and hose sections are releasably secured to one another by hose clamps 218. The lower extremity of the filter bowl extension 220 on the filter body is externally enlarged to form a filter bowl seating shoulder 222.

Filter bowl 204 has an annular rim 224 surrounding its upper open end which is dimensioned to fit slidably within the lower open end of the filter body extension 220. An annular seating shoulder 226 surrounds the bowl at the base of the rim 224. When the filter bowl 204 is positioned on the filter body 202, this shoulder is disposed in confronting relation to the body shoulder 222. A seal ring or gasket 228 is placed between the shoulders, as shown. In FIGURES 10 through 12, the filter bowl 204 is removably secured to the filter body 202 by means of a metal clamp 230. This clamp includes a ring 232 which is internally dimensioned to slidably receive the tubular body of the filter bowl below its seating shoulder 226. About the upper end of the clamp ring 232 is an outwardly directed flange 234 which seats against the under side of the filter bowl shoulder 226. Joined at their lower ends to diametrically opposite sides of the clamp ring flange 234 are straps 236, 238 which extend upwardly along opposite sides of and then across the top of the filter body 202. The upper end of the strap 236 is secured to a conventional worm screw tensioning device 240 which receives the upper end of the other strap 138. This tensioning device includes a rotary worm screw 242, the threads of which peripherally engage the upper end of the strap 236 in such a way that the worm screw may be rotated to feed the latter strap longitudinally in either direction through the tensioning device 240, thus to selectively tension and release the clamp 230. When the clamp is tensioned, the clamp ring flange 234 is drawn upwardly against the filter bowl shoulder 226, thus to urge this shoulder against the gasket 228 and rigidly secure the filter bowl 204 to the filter body 202. The filter bowl is removable from the filter body by rotating the worm screw 242 in a direction to feed the clamp strap 238 from the tension device 240, thereby to release the upper ends of the straps 236, 238 for separation. In the illustrated embodiment of the invention, the upper portion of the clamp 230, including the straps 236, 238 and the tensioning device 240, comprises a conventional hose clamp. The lower clamp ring 232, 234 is separately formed with integral, diametrically opposed strap ends which are welded or otherwise joined to the clamp straps 236, 238, as shown.

The filter insert 206, which may be molded of plastic, has an upper perforated filter plate 244, or filter as it will be hereinafter referred to, and a lower cylindrically curved flange 246 which is integrally joined to the lower, upstream edge of the filter. This flange is dimensioned to fit closely within the filter body extension 220 above the filter bowl rim 224, in the manner best illustrated in FIGURE 11. The lower edge of the filter flange seats on the upper edge of the bowl rim. Integrally formed with and rising from the upper surface of the filter 244 is a relatively slender stop fin 248 which is disposed in a plane containing the longitudinal axis of the coolant passage 250 through the filter body. The upper end of this fin seats against the upper wall of the body. Integrally formed on the inner surface of the filter body 202, at diametrically opposite sides of the body extension 220 and disposed in a common plane normal to the axis of the coolant passage 250, are a pair of filter insert positioning ribs 252. When the filter insert 206 is positioned in the filter body 202, the under surface of the filter 244 seats on the upper ends of these ribs.

The parts of the filter unit 202 are so shaped and dimensioned that when the filter bowl clamp 230 is tensioned, the filter bowl rim 224 is urged upwardly against the filter insert flange 246, and the filter 244 and its stop fin 248 are thereby wedged snugly between the upper wall of the filter body 202 and the filter insert positioning ribs 252. This wedging action firmly locates the filter insert 206 in the proper position within the filter body. In this position, the filter 244 spans the lower portion only, of the coolant passage 250 and inclines toward the filter bowl 204 in the direction of coolant flow through the passage, as in the earlier embodiments of the invention. The remaining upper portion of the coolant passage 250, which is not spanned by the filter 244, defines a coolant bypass 254 around the filter. As in the earlier embodiments of the invention, this coolant bypass is dimensioned to accommodate adequate coolant flow to prevent overheating of the engine in the event the filter 244 becomes completely clogged.

The filter bowl 204 preferably contains a magnet 256, as before, for attracting and holding any ferromagnetic articles which enter the bowl. In addition, a rust inhibitor 258 is preferably slidably fitted on the filter stop fin 248. This rust inhibitor, which may be aerodynamically shaped, as shown, to minimize the resistance to coolant flow through the bypass 254 and around the inhibitor, is composed of a material, such as zinc or magnesium, which neutralizes the harmful chemicals in the coolant. To this end, the rust inhibitor is grounded to the engine block or vehicle chassis by a wire 260. The rust inhibitor is consumed with use and thus must be periodically replaced. Such replacement is accomplished by removing the filter insert 206 and sliding a new inhibitor over the stop fin 248.

Removal of the filter insert 206 is accomplished by first removing the filter bowl 204 and then removing the insert through the opening in the filter body extension 220. In this regard, it will be understood that the parts of the filter unit 200 are shaped and dimensioned to permit such removal of the insert through the body extension by first rotating the insert in the counterclockwise direction in FIGURE 11 to clear the positioning ribs 252 and then withdrawing the insert. The insert is replaced by reversing this procedure. At this point, it is significant to note that the ribs 252 are slightly offset relative to the axis of the filter body extension 220. This precludes improper installation of the filter insert 206 in the filter body 202, i.e. installation in such a way that the curved insert flange 246 is located at the right hand side of the positioning ribs 252 in FIGURE 11.

The modified filter unit 200a illustrated in FIGURE 13 is identical, except for its filter bowl clamp 230a, to the filter unit 200 just described. The modified bowl clamp 230a comprises a strap 236a, the central portion of which extends diametrically across the under side of and is spot welded or otherwise secured to a ring or cup 232a seating the lower end of the filter bowl 204a. The ends of the clamp strap 236a extend upwardly along opposite sides of the filter bowl 204a and the filter body 202a and are joined by a worm screw tensioning device 240a. This tensioning device includes a worm screw 242a which may be rotated to selectively tension and release the filter bowl clamp 230a, in the same manner as discussed earlier in connection with the filter unit 200.

At this point, it is evident that the modified filter units 200 and 200a of the invention function in the same manner as the earlier embodiments of the invention. However, the filter units 200, 200a are superior, in certain respects, to the earlier embodiments. One advantage of the filter units 200, 200a, for example, resides in the fact that the filter insert 206, 206a may be removed through the filter body extension 220, 220a by first removing the filter bowl 204, 204a, thus eliminating the necessity of disengaging the filter units from the radiator hose sections, as is required in the earlier embodiments of the invention. Another advantage of the preferred embodiments of the invention is that the condition and level of the engine coolant, as well as the condition of the filters of the filter units may be visually observed through the transparent wall of the filter body. As noted earlier, this visual observation of the coolant level may be accomplished without removal of the engine radiator cap and thereby eliminates the safety hazard attendant to such radiator cap removal when the engine is hot. Visual observation of the filter through the transparent well of the filter body, of course, is advantageous for the reason that the condition of the filter, i.e., the extent to which the filter is blocked by foreign matter, may be quickly and easily checked at any time without removal of the filter bowl. Also, of course, the condition of the rust inhibitor may be similarly visually checked.

Those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

I claim:

1. A filter unit for installation in the engine cooling system of an automotive vehicle to trap foreign material entrained in the engine coolant, comprising:
   a hollow body forming a coolant passage with inlet and outlet ends and a lateral opening to said passage between said ends,
   a filter bowl removably carried by said body and having an open end positioned within said lateral body opening to receive foreign material from said passage, said filter bowl having a rim surrounding said open end thereof and defining an annular shoulder face exposed within said lateral body opening,
   a filter within said passage having a downstream edge adjacent the downstream side of said body opening and an opposite upstream edge, and the flange extending from said downstream edge through said body opening into seating contact with said bowl shoulder,
   said filter spanning a portion only of said passage so as to define with the wall of said passage a coolant bypass around said filter,
   mounting means supporting said filter in said passage opposite the opening to said filter bowl in such manner that said filter inclines toward said opening in the direction of coolant flow through said passage, whereby said filter is effective to remove foreign material from said coolant and divert foreign material to said bowl, said filter mounting means comprising inner ribs on said body at opposite sides of said body opening seating against one side of said filter, and a stop fin extending across said bypass between the other side of said filter and the opposite wall of said body, said ribs and stop fin coacting to position said filter in said coolant passage and the frontal area of said stop fin in the direction of coolant flow through said passage being substantially less than the cross-sectional area of said bypass, whereby said stop fin does not materially obstruct coolant flow through said bypass, and
   the cross-sectional area of said bypass being such as to accommodate sufficient coolant flow through said bypass to prevent engine overheating in the event coolant flow through said filter is completely blocked due to clogging of said filter by foreign material.

2. A filter unit according to claim 1 wherein:
said stop fin is rigidly joined at one end to said filter and seats at its other end against said opposing body wall in such manner that said filter and stop fin are wedged firmly between said body ribs and opposing body wall.

3. A filter unit according to claim 2 wherein:
said body ribs are disposed in off center relation relative to the axis of said body opening in such manner as to preclude improper installation of said filter in said body.

4. A filter unit according to claim 1 including:
a rust inhibitor slidably fitted on said stop fin, whereby said rust inhibitor is replaceable by removal of said filter from said body.

5. An accessory for installation between two sections of hose between the radiator and water jacket of the cooling system of an automotive vehicle to trap foreign material in the liquid coolant, comprising:

a hollow body forming a passage with inlet and outlet ports at opposite ends of the passage, a receptacle carried by said body below the passage with its top open to the passage to receive foreign material therefrom, said receptacle being constructed for access to remove the foreign material, an upper transverse baffle means at the inlet end of the passage dividing the stream of coolant into a lower major portion and an upper minor bypass portion, the upstream end of said baffle means being turned downward to overhang the major portion of the passage to divert a portion of the stream of coolant to the bypass portion of the passage with consequent increase in velocity of flow through the bypass portion to discourage clogging of the bypass portion, and a filter member spanning the major portion of the passage, the filter member overhanging the receptacle and inclining downward from the baffle toward the outlet end of the passage to divert foreign material into the receptacle.

6. An accessory for installation between two sections of hose between the radiator and the water jacket of the cooling system of an automotive vehicle to trap foreign material in the liquid coolant, comprising:

a hollow body forming a passage with inlet and outlet ports at opposite ends of the passage;

a receptacle carried by the body below the passage with its top open to the passage to receive foreign material therefrom, said receptacle being made of light-transmitting material to make its contents visible and being removable from the body;

a transverse baffle at the inlet end of the passage dividing the stream of coolant into a lower major portion and an upper minor bypass portion, said baffle being turned downward across the open top of the receptacle and completely spanning said major portion of the passage, said baffle having a relatively large opening therein in alignment with the passage;

a filter element spanning said opening, said body having an inclined interior flange abutting the downstream face of the baffle along the major portion of the margin of the baffle;

means removably connecting the upstream end of the baffle rigidly with the body to support the baffle in position adjacent the inclined flange; and an interior shoulder formed by the body in engagement with the lower end of the baffle to hold the baffle against the interior flange.

7. A combination as set forth in claim 6 which includes a magnet in the said receptacle to attract ferromagnetic particles.

References Cited

UNITED STATES PATENTS

| | | | |
|---|---|---|---|
| 734,812 | 7/1903 | Bush | 210—313 |
| 1,231,477 | 6/1917 | Bibb et al. | |
| 1,370,425 | 3/1921 | Garber | 210—312 X |
| 1,424,197 | 8/1922 | Gebhard | 210—312 X |
| 1,682,867 | 9/1928 | Thomas | 210—443 |
| 1,742,281 | 1/1930 | Rundlett | 210—167 X |
| 1,857,606 | 5/1932 | Rendelman | 210—303 X |
| 1,887,781 | 11/1932 | Parr | 210—167 |
| 1,922,863 | 8/1933 | Rendelman et al. | 210—167 X |
| 1,987,847 | 1/1935 | Flood | 210—434 X |
| 2,259,711 | 10/1941 | Oberly. | |
| 2,415,246 | 2/1947 | Hunt | 210—313 X |
| 2,580,012 | 12/1951 | Gazda | 210—263 X |
| 2,660,317 | 11/1953 | Mork et al. | 210—434 |
| 3,040,898 | 6/1962 | Simmons | 210—312 |
| 3,050,189 | 8/1962 | Williams | 210—440 X |

SAMIH N. ZAHARNA, *Primary Examiner.*

FRANK MEDLEY, *Examiner.*